(12) United States Patent
Noh et al.

(10) Patent No.: US 12,520,254 B2
(45) Date of Patent: Jan. 6, 2026

(54) METHOD AND APPARATUS FOR BEAM MANAGEMENT IN SIDELINK COMMUNICATION

(71) Applicant: ELECTRONICS AND TELECOMMUNICATIONS RESEARCH INSTITUTE, Daejeon (KR)

(72) Inventors: Go San Noh, Daejeon (KR); Jun Hyeong Kim, Daejeon (KR); Seon Ae Kim, Daejeon (KR); Il Gyu Kim, Daejeon (KR); Hee Sang Chung, Daejeon (KR); Dae Soon Cho, Daejeon (KR); Sung Woo Choi, Daejeon (KR); Seung Nam Choi, Daejeon (KR); Jung Pil Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 442 days.

(21) Appl. No.: 18/092,597

(22) Filed: Jan. 3, 2023

(65) Prior Publication Data
US 2023/0217384 A1   Jul. 6, 2023

(30) Foreign Application Priority Data

Jan. 4, 2022   (KR) ................ 10-2022-0000940
Dec. 28, 2022  (KR) ................ 10-2022-0187104

(51) Int. Cl.
*H04W 56/00*   (2009.01)
*H04W 16/28*   (2009.01)
*H04W 24/10*   (2009.01)

(52) U.S. Cl.
CPC ......... *H04W 56/001* (2013.01); *H04W 16/28* (2013.01); *H04W 24/10* (2013.01)

(58) Field of Classification Search
CPC .... H04W 56/001; H04W 16/28; H04W 24/10
See application file for complete search history.

(56) References Cited

U.S. PATENT DOCUMENTS

| | | |
|---|---|---|
| 2020/0053704 A1 | 2/2020 | Kim et al. |
| 2020/0260214 A1* | 8/2020 | Wu ................... H04W 72/20 |
| 2020/0322910 A1 | 10/2020 | Zhang et al. |
| 2020/0413374 A1 | 12/2020 | Luo et al. |
| 2021/0022116 A1 | 1/2021 | Lee et al. |
| 2021/0321344 A1 | 10/2021 | Ryu et al. |
| 2022/0030613 A1* | 1/2022 | Wang .................. H04W 72/20 |
| 2022/0039080 A1* | 2/2022 | Khoryaev ............ H04W 4/025 |

(Continued)

*Primary Examiner* — Deepa Belur
(74) *Attorney, Agent, or Firm* — LRK PATENT LAW FIRM

(57) ABSTRACT

An operation method of a first terminal may include: transmitting a plurality of sidelink-synchronization signal blocks (S-SSBs); performing a monitoring operation on a plurality of response resources associated with the plurality of S-SSBs; receiving a first response signal from a second terminal in a first response resource among the plurality of response resources; identifying a first S-SSB associated with the first response resource among the plurality of S-SSBs; and determining a first transmission beam through which the first S-SSB is transmitted among a plurality of transmission beams of the first terminal as an optimal transmission beam.

13 Claims, 13 Drawing Sheets

(56) References Cited

U.S. PATENT DOCUMENTS

| | | |
|---|---|---|
| 2022/0046430 A1 | 2/2022 | Liu et al. |
| 2022/0046631 A1* | 2/2022 | Li et al. |
| 2022/0303952 A1* | 9/2022 | Hoang ................. H04L 5/0044 |
| 2023/0180187 A1* | 6/2023 | Kim ...................... H04W 72/51 |
| | | 370/329 |
| 2023/0232426 A1* | 7/2023 | Liu ...................... H04B 7/0621 |
| | | 370/330 |

* cited by examiner

METHOD AND APPARATUS FOR BEAM MANAGEMENT IN SIDELINK COMMUNICATION

CROSS-REFERENCE TO RELATED APPLICATIONS

This application claims priority to Korean Patent Applications No. 10-2022-0000940, filed on Jan. 4, 2022, and No. 10-2022-0187104, filed on Dec. 28, 2022, with the Korean Intellectual Property Office (KIPO), the entire contents of which are hereby incorporated by reference.

BACKGROUND

1. Technical Field

Exemplary embodiments of the present disclosure relate to a sidelink communication technique, and more specifically, to a beam management technique for terminals in sidelink communication.

2. Description of Related Art

A communication network (e.g., 5G communication networks, 6G communication networks, etc.) to provide improved communication services than the existing communication network (e.g., long term evolution (LTE), LTE-advanced (LTE-A), etc.) is being developed. The 5G communication network (e.g., a new radio (NR) communication network) can support a frequency band of 6 GHz or above as well as a frequency band of 6 GHz or below. That is, the 5G communication network may support a frequency range 1 (FR1) band and/or a FR2 band. The 5G communication network can support a variety of communication services and scenarios compared to the LTE communication network. For example, usage scenarios of the 5G communication network may include enhanced mobile broadband (eMBB), ultra-reliable low-latency communication (URLC), massive machine type communication (mMTC), and the like.

The 6G communication network can support a variety of communication services and scenarios compared to the 5G communication network. The 6G communication network can satisfy the requirements of hyper-performance, hyper-bandwidth, hyper-space, hyper-precision, hyper-intelligence, and/or hyper-reliability. The 6G communication network can support a wide variety of frequency bands and can be applied to various usage scenarios (e.g., terrestrial communication, non-terrestrial communication, sidelink communication, and the like).

Meanwhile, sidelink communication may be performed in the FR2 band, and in this case, beam-based sidelink communication may be performed. For beam-based sidelink communication, a method for a transmitting terminal to select an optimal transmission beam and a method for a receiving terminal to select an optimal reception beam are required.

SUMMARY

Exemplary embodiments of the present disclosure provide a method and an apparatus for selecting an optimal beam between a transmitting terminal and a receiving terminal in sidelink communication.

According to a first exemplary embodiment of the present disclosure, an operation method of a first terminal may comprise: transmitting a plurality of sidelink-synchronization signal blocks (S-SSBs); performing a monitoring operation on a plurality of response resources associated with the plurality of S-SSBs; receiving a first response signal from a second terminal in a first response resource among the plurality of response resources; identifying a first S-SSB associated with the first response resource among the plurality of S-SSBs; and determining a first transmission beam through which the first S-SSB is transmitted among a plurality of transmission beams of the first terminal as an optimal transmission beam.

The operation method may further comprise receiving, from the base station, configuration information of an association relationship between the plurality of S-SSBs and the plurality of response resources.

The plurality of response resources may be configured to be distinguished in at least one of time domain and frequency domain.

A beam management method in sidelink communication may be classified into a channel measurement-based beam management method and a zone-based beam management method, beam management may be performed based on a measurement result of S-SSBs in the channel measurement-based beam management method, beam management may be performed based on information on zones in which the first terminal and the second terminal are located without the measurement result of S-SSBs, and information indicating a type of the beam management method may be received from the base station.

The plurality of response resources may be a plurality of physical sidelink feedback channel (PSFCH) resources.

When the first terminal does not transmit data to the second terminal, the plurality of PSFCH resources may be used for transmission of a response signal for notifying an S-SSB selected by the second terminal instead of hybrid automatic repeat request (HARQ)-acknowledgement (ACK) information.

The operation method may further comprise transmitting, to the second terminal, sidelink control information (SCI) including an HARQ feedback enable/disable indicator, wherein when a value of the HARQ feedback enable/disable indicator indicates 'disable', the plurality of PSFCH resources may be used for transmission of a response signal for notifying an S-SSB selected by the second terminal instead of HARQ-ACK information.

The operation method may further comprise transmitting, to the second terminal, information indicating a frequency resource used for transmission of a response signal for notifying an S-SSB selected by the second terminal from among the plurality of PSFCH resources, wherein the first response signal may be received through the frequency resource indicated by the first terminal within the first response resource.

The operation method may further comprise transmitting, to the second terminal, a cyclic shift value applied to a response signal for notifying an S-SSB selected by the second terminal, wherein the monitoring operation on the plurality of response resources may be performed using the cyclic shift value.

According to a second exemplary embodiment of the present disclosure, an operation method of a second terminal may comprise: receiving configuration information of an association relationship between a plurality of sidelink-synchronization signal blocks (S-SSBs) and a plurality of response resources; performing a measurement operation on the plurality of S-SSBs received from a first terminal; selecting a first S-SSB from among the plurality of S-SSBs based on a result of the measurement operation; identifying a first response resource associated with the first S-SSB among the plurality of response resources based on the configuration information; and transmitting a first response signal to the first terminal in the first response resource.

A beam management method in sidelink communication may be classified into a channel measurement-based beam management method and a zone-based beam management method, beam management may be performed based on a measurement result of S-SSBs in the channel measurement-based beam management method, beam management may be performed based on information on zones in which the first terminal and the second terminal are located without the measurement result of S-SSBs, and information indicating a type of the beam management method may be received from a base station or the first terminal.

The plurality of response resources may be a plurality of physical sidelink feedback channel (PSFCH) resources.

When the first terminal does not transmit data to the second terminal, the plurality of PSFCH resources may be used for transmission of a response signal for notifying an S-SSB selected by the second terminal instead of hybrid automatic repeat request (HARQ)-acknowledgement (ACK) information.

The operation method may further comprise receiving, from the first terminal, sidelink control information (SCI) including an HARQ feedback enable/disable indicator, wherein when a value of the HARQ feedback enable/disable indicator indicates 'disable', the plurality of PSFCH resources may be used for transmission of a response signal for notifying an S-SSB selected by the second terminal instead of HARQ-ACK information.

The operation method may further comprise receiving, from the first terminal, information indicating a frequency resource used for transmission of a response signal for notifying an S-SSB selected by the second terminal from among the plurality of PSFCH resources, wherein the first response signal may be transmitted through the frequency resource indicated by the first terminal within the first response resource.

The operation method may further comprise receiving, from the first terminal, a cyclic shift value applied to a response signal for notifying an S-SSB selected by the second terminal, wherein the first response signal may be generated based on the cyclic shift value.

According to a third exemplary embodiment of the present disclosure, an operation method of a first terminal may comprise: identifying a first location of the first terminal; obtaining zone information indicating a second zone in which a second terminal is located; identify a second location of the second terminal based on the zone information; and selecting a first beam directed to the second terminal from among a plurality of beams of the first terminal in consideration of the first location and the second location.

The first location may be identified based on information of a first zone in which the first terminal is located or information obtained through a Global Navigation Satellite System (GNSS).

The second location may be determined as a center location of the second zone in which the second terminal is located.

A beam management method in sidelink communication may be classified into a channel measurement-based beam management method and a zone-based beam management method, beam management may be performed based on a measurement result of S-SSBs in the channel measurement-based beam management method, beam management may be performed based on information on zones in which the first terminal and the second terminal are located without the measurement result of S-SSBs, and information indicating a type of the beam management method may be received from a base station.

According to the present disclosure, a beam management method in sidelink communication can be efficiently performed. That is, a channel measurement-based beam management method or a zone-based beam management method may be performed. In this case, an optimal transmission beam of a transmitting terminal and an optimal reception beam of a receiving terminal can be determined, and sidelink communication can be performed using an SL beam pair (e.g., optimal transmission beam-optimal reception beam). Accordingly, the performance and reliability of sidelink communication can be improved, and the efficiency of using sidelink resources can be improved.

DETAILED DESCRIPTION OF THE EMBODIMENTS

Figure 1:
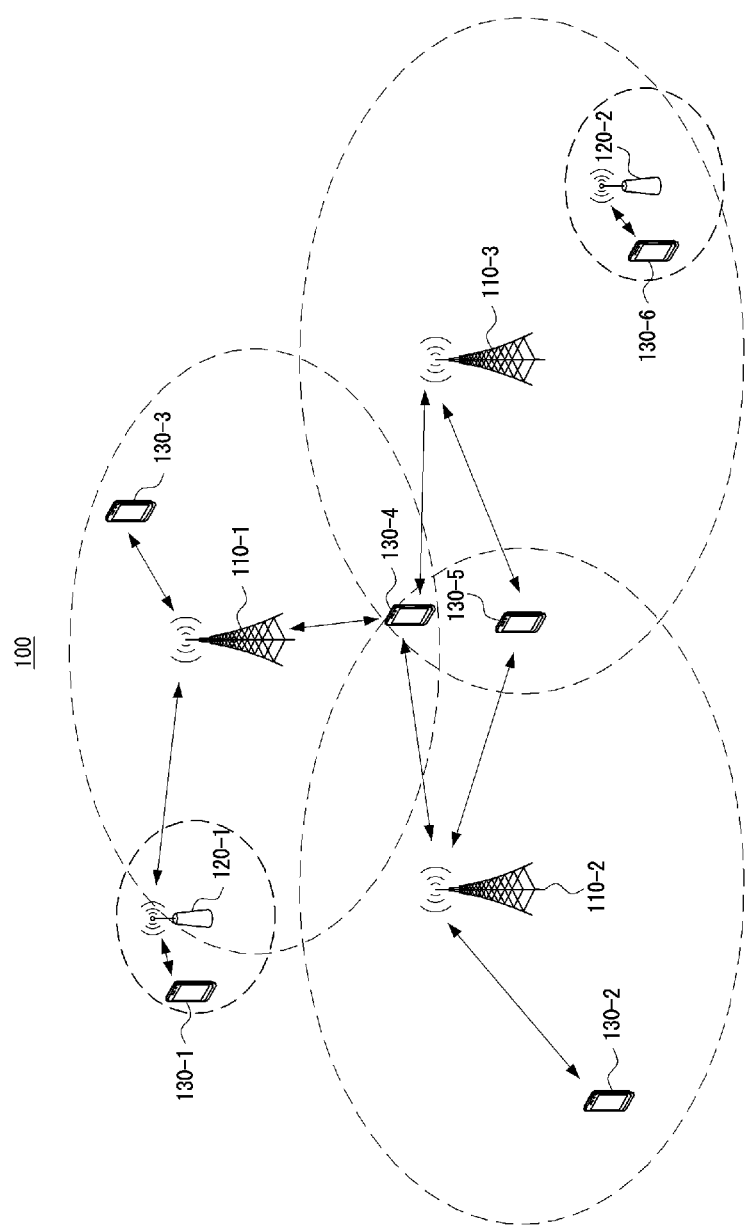
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be a 4G communication network (e.g., a long-term evolution (LTE) communication system or an LTE-advanced (LTE-A) communication system), a 5G communication network (e.g., a new radio (NR) communication system), or the like. The 4G communication system may support communication in a frequency band of 6 GHz or below. The 5G communication system may support communication in a frequency band of 6 GHz or above, as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network. The 'LTE' may refer to the 4G communication system, LTE communication system, or LTE-A communication system, and the 'NR' may refer to the 5G communication system or NR communication system.

In exemplary embodiments, "an operation (e.g., transmission operation) is configured" may mean that "configuration information (e.g., information element(s) or parameter(s)) for the operation and/or information indicating to perform the operation is signaled". "Information element(s) (e.g., parameter(s)) are configured" may mean that "corresponding information element(s) are signaled". The signaling may be at least one of system information (SI) signaling (e.g., transmission of system information block (SIB) and/or master information block (MIB)), RRC signaling (e.g., transmission of RRC parameters and/or higher layer parameters), MAC control element (CE) signaling, or PHY signaling (e.g., transmission of downlink control information (DCI), uplink control information (UCI), and/or sidelink control information (SCI)).

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. In addition, the communication system 100 may further include a core network (e.g., serving-gateway (S-GW), packet data network (PDN)-gateway (P-GW), and mobility management entity (MME)). When the communication system 100 is the 5G communication system (e.g., NR system), the core network may include an access and mobility management function (AMF), a user plane function (UPF), a session management function (SMF), and the like.

The plurality of communication nodes 110 to 130 may support the communication protocols (e.g., LTE communication protocol, LTE-A communication protocol, NR communication protocol, etc.) defined by technical specifications of 3rd generation partnership project (3GPP). The plurality of communication nodes 110 to 130 may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may refer to an apparatus or a device. Exemplary embodiments to be described below may be performed by the apparatus or device. A structure of the apparatus (e.g., device) may be as follows.

Figure 2:
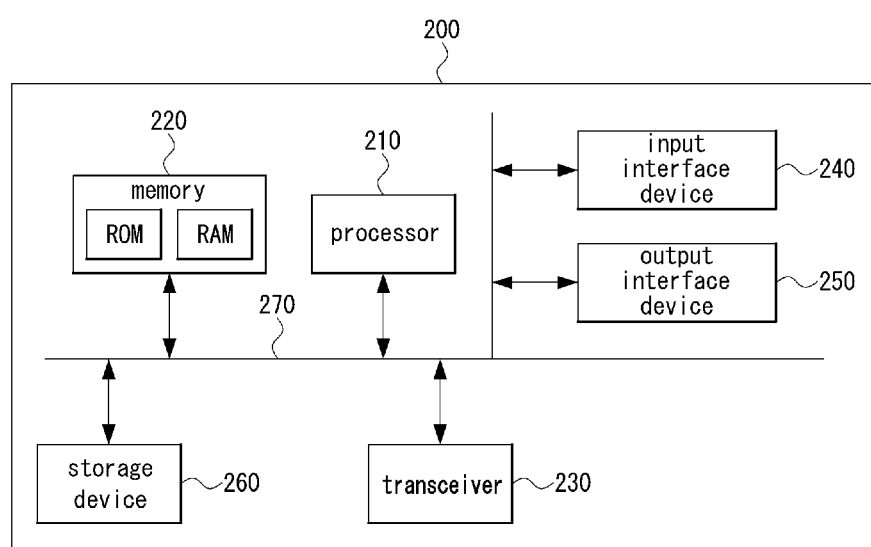
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), an advanced base station (BTS), a high reliability-base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability-relay station (HR-RS), a home NodeB (HNB), a home eNodeB (HeNB), a roadside unit (RSU), a radio remote head (RRH), a transmission point (TP), a transmission and reception point (TRP), a macro cell, a pico cell, a micro cell, a femto cell, or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, according to resolution of a frequency shortage problem and need for high-capacity transmission of broadband, a high-frequency band (e.g., mmWave band, frequency range 2 (FR2) band) may be used in the 5G communication system. In a high frequency band, available frequencies may be plentiful. In a high-frequency band, a loss due to a pass loss may be large, and a propagation performance of radio waves may decrease due to reflection, diffraction, and/or scattering according to a straightness of the radio waves.

A beam-based communication method using a directional antenna that concentrates radio waves in a specific direction rather than omni-direction in consideration of characteristics of a high frequency band may be applied. In a high frequency band, the size of a physical antenna element for forming a directional beam may be reduced, and a spacing between antennas in an antenna array may be reduced. Therefore, communication using a directional beam may be easily applied in a high frequency band. When radio waves are concentrated in a specific direction using a directional beam, coverage in the specific direction may be increased, and interference in directions other than the specific direction may be reduced.

In order to form a directional beam, a digital beamforming scheme, an analog beamforming scheme, or a hybrid beamforming scheme may be used. In the digital beamforming scheme, individual baseband signals may be generated for all antenna elements. In the analog beamforming scheme, all antenna elements may change a gain or phase of one baseband signal. The hybrid beamforming scheme may be a scheme in which the digital beamforming scheme and the analog beamforming scheme are combined. In the hybrid beamforming scheme, all antenna elements may change gains or phases of a plurality of baseband signals.

Figure 3:
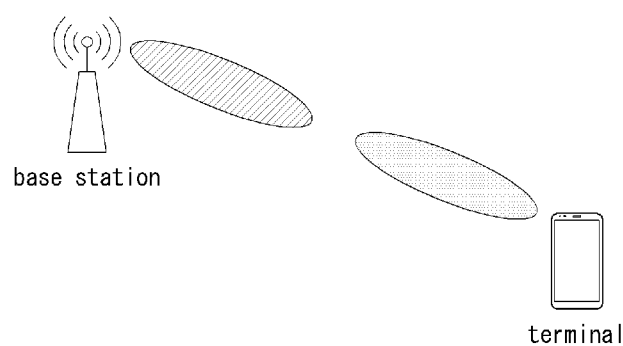
FIG. 3 is a conceptual diagram illustrating a first exemplary embodiment of a beam-based communication method.
Figure 4:
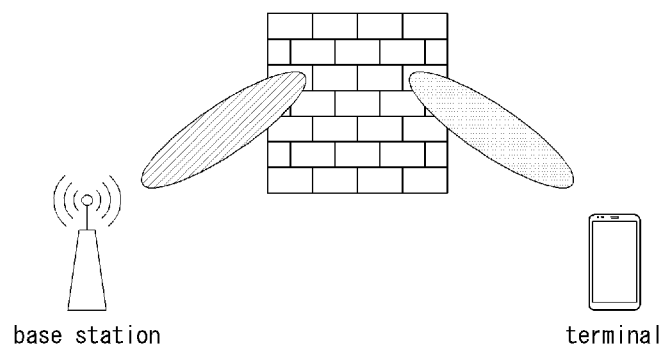
FIG. 4 is a conceptual diagram illustrating a second exemplary embodiment of a beam-based communication method.

FIG. 3 is a conceptual diagram illustrating a first exemplary embodiment of a beam-based communication method, and FIG. 4 is a conceptual diagram illustrating a second exemplary embodiment of a beam-based communication method.

Referring to FIGS. 3 and 4, there may be a difference between communication using a directional beam and communication using an omni-directional beam. In the exemplary embodiment of FIG. 3, in order to obtain the maximum beam gain, a transmission beam of a transmitter and a reception beam of a receiver may be disposed in opposite directions. In this case, signal transmission may be performed efficiently and coverage may be maximized. In downlink communication, the transmitter may be a base station and the receiver may be a terminal. In uplink communication, the transmitter may be a terminal and the receiver may be a base station. In sidelink communication, the transmitter may be a first terminal (i.e., transmitting terminal), and the receiver may be a second terminal (i.e., receiving terminal). In the exemplary embodiment of FIG. 4, a transmission beam of a transmitter and a reception beam of a receiver may be disposed to be directed to a common scatterer. In this case, a beam gain may be obtained.

Various methods may be supported to support the beam-based communication in the 5G communication system. In an initial access procedure, a base station may transmit a synchronization signal block (SSB) burst. An SSB burst may include a plurality of SSBs. The transmission of the SSB burst may mean repeated transmission of SSBs. A terminal may receive the SSB burst (e.g., a plurality of SSBs) from the base station and select an optimal beam based on a measurement result of the SSBs. In a random access procedure, an optimal beam for communication between the terminal and the base station may be selected.

Figure 5:
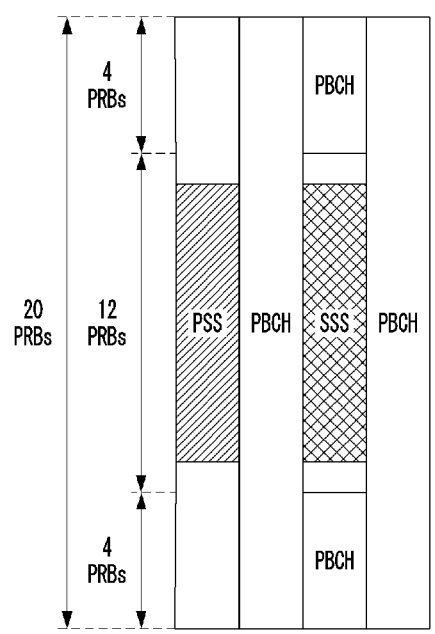
FIG. 5 is a conceptual diagram illustrating a first exemplary embodiment of an SSB.

FIG. 5 is a conceptual diagram illustrating a first exemplary embodiment of an SSB.

Referring to FIG. 5, an SSB may include a primary synchronization signal (PSS), a secondary synchronization signal (SSS), and a physical broadcast channel (PBCH). In addition, the SSB may further include a PBCH demodulation reference signal (DMRS). The PBCH DMRS may mean a DMRS used for demodulation of the PBCH. The SSB may be referred to as SS/PBCH block. The SSB may be disposed in 20 physical resource blocks (PRBs) in the frequency domain. The SSB may be disposed in 4 symbols (e.g., 4 orthogonal frequency division multiplexing (OFDM) symbols) in the time domain.

Figure 6:
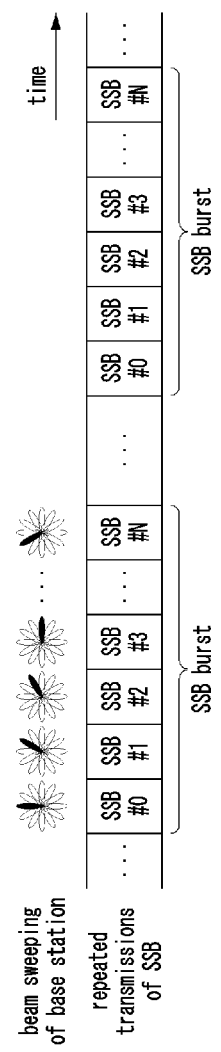
FIG. 6 is a conceptual diagram illustrating a first exemplary embodiment of an SSB transmission method.

FIG. 6 is a conceptual diagram illustrating a first exemplary embodiment of an SSB transmission method.

Referring to FIG. 6, the SSB may be repeatedly transmitted in the time domain. The SSB may be transmitted on an SSB burst basis. The base station may transmit the SSB according to a beam sweeping scheme. For example, the base station may transmit SSBs using different beams. In a cell search procedure, the terminal may receive SSB(s) from the base station, measure a reception quality (e.g., reference signal received power (RSRP), reference signal received quality (RSRQ), received signal strength indicator (RSSI)), and identify an index of an SSB having the best reception quality. The terminal may determine a transmission beam of the base station associated with the identified SSB index as an optimal transmission beam of the base station.

The SSB may be repeatedly transmitted through the transmission beam (i.e., optimal transmission beam) of the base station. The terminal may perform a measurement operation on the SSB(s) transmitted through the same transmission beam (i.e., optimal transmission beam) of the base station by sweeping reception beams, and may determine an optimal reception beam based on a measurement result of the SSB(s). According to the above-described operation, a beam pair between the base station and the terminal may be determined.

Then, in the random access procedure, the terminal may inform the base station of information on the beam pair (or information on the optimal transmission beam of the base station). A random access channel (RACH) occasion may be associated with an SSB. The RACH occasion may be a resource (e.g., time and/or frequency resource) capable of transmitting a random access (RA) preamble. The RACH occasion may be referred to as an RO. One SSB may be associated with one or more ROs. Alternatively, one RO may be associated with one or more SSBs. The base station may transmit configuration information on an association between RO(s) and SSB(s) to the terminal. The terminal may receive the configuration information from the base station, and may identify the association between RO(s) and SSB(s) based on the configuration information. In addition, the base station may configure an association between an RO and a channel state information-reference signal (CSI-RS) to the terminal. The configuration information on the association may be transmitted through a system information block (SIB) and/or an RRC message.

Figure 7:
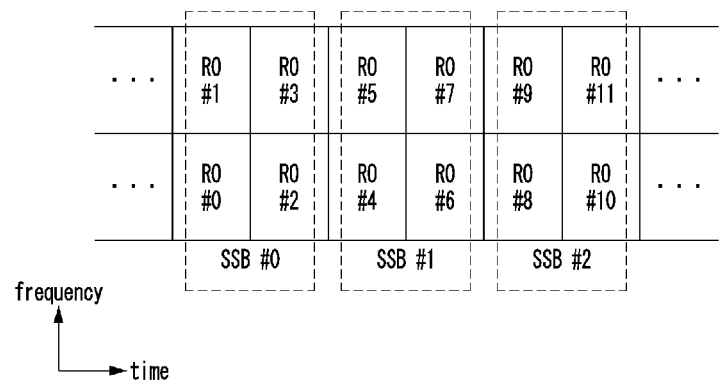
FIG. 7 is a conceptual diagram illustrating a first exemplary embodiment showing an association relationship between RO(s) and SSB(s).

FIG. 7 is a conceptual diagram illustrating a first exemplary embodiment showing an association relationship between RO(s) and SSB(s).

Referring to FIG. 7, an SSB #0 may be associated with ROs #0 #3, an SSB #1 may be associated with ROs #4 to #7, and an SSB #2 may be associated with ROs #8 to #11. When a transmission beam associated with the SSB #1 is determined to be an optimal transmission beam of the base station based on a measurement result of SSB(s), the terminal may transmit an RA preamble to the base station in at least one RO among the ROs #4 to #7 associated with the SSB #1. The base station may receive the RA preamble of the terminal by performing a monitoring operation on the RO(s). When the RA preamble of the terminal is received in at least one RO among the ROs #4 to #7, the base station may identify the SSB #1 associated with the ROs #4 to #7, and determine a beam associated with the SSB #1 (e.g., a transmission beam through which the SSB #1 is transmitted) as an optimal transmission beam.

After completion of the initial access procedure, a beam management procedure may be performed using SSB, CSI-RS, and/or sounding reference signal (SRS). The beam management procedures may be performed for downlink, uplink, and/or sidelink. The beam management procedure may include a beam selection procedure, a beam change procedure, and/or a beam refinement procedure. In the beam refinement procedure, a narrow beam may be determined, additional beam gain may be obtained and interference may be reduced by using the narrow beam.

A downlink beam management procedure may be divided into a procedure of selecting a transmission beam the base station and a procedure of selecting a reception beam of the terminal.

Figure 8:
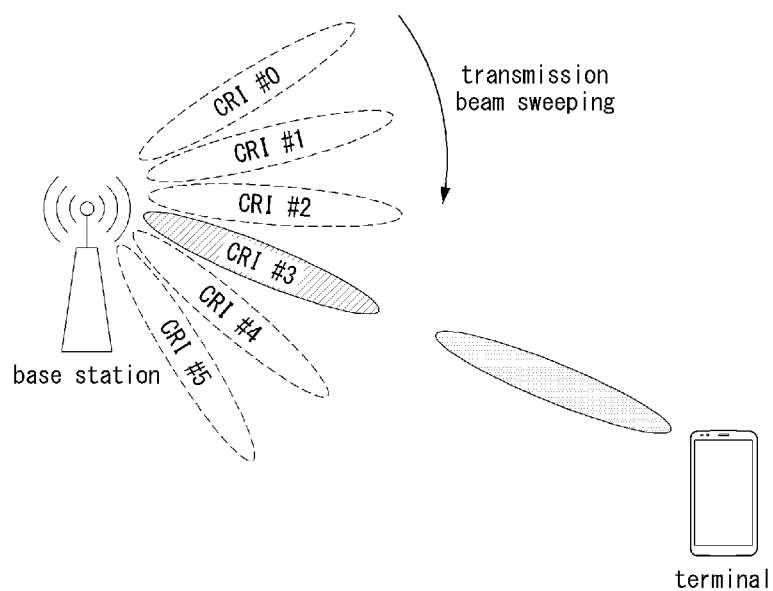
FIG. 8 is a conceptual diagram illustrating a first exemplary embodiment of a procedure of selecting a transmission beam of a base station.

FIG. 8 is a conceptual diagram illustrating a first exemplary embodiment of a procedure of selecting a transmission beam of a base station.

Referring to FIG. 8, the base station may transmit a signal based on the beam sweeping scheme. In the present disclosure, the signal may include a synchronization signal (e.g., SSB), reference signal (e.g., CSI-RS, DM-RS, SRS, phase tracking (PT)-RS), and/or channel. When the base station transmits a CSI-RS, a transmission beam of the base station may be distinguished by a CSI-RS resource indicator (CRI) assigned to the corresponding transmission beam. The terminal may receive the signal from the base station and perform a measurement operation on the signal. The terminal may perform the measurement operation on the signal using a fixed reception beam. For example, the terminal may measure an RSRP (or RSRQ, RSSI) of the signal. The terminal may report RSRPs for up to 4 transmission beams to the base station. For example, the terminal may report the largest RSRP and a difference between the largest RSRP and each of the remaining three RSRPs to the base station. The base station may receive the RSRP(s) of the transmission beam(s) from the terminal, and select an optimal transmission beam based on the RSRP(s). Here, a transmission beam associated with a CRI #3 may be determined as an optimal transmission beam.

Figure 9:
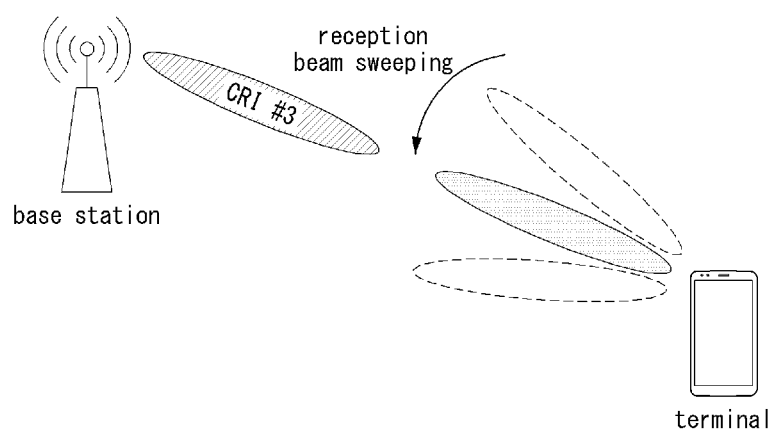
FIG. 9 is a conceptual diagram illustrating a first exemplary embodiment of a procedure of selecting a reception beam of a terminal.

FIG. 9 is a conceptual diagram illustrating a first exemplary embodiment of a procedure of selecting a reception beam of a terminal.

Referring to FIG. 9, the reception beam selection procedure may be performed after the transmission beam selection procedure illustrated in FIG. 8 is completed. The base station may repeatedly transmit a signal (e.g., CSI-RS) using one transmission beam in the time domain. The one transmission beam may be the optimal transmission beam (e.g., transmission beam associated with the CRI #3) selected in the transmission beam selection procedure illustrated in FIG. 8. The terminal may perform a measurement operation on the signal received from the base station by sweeping reception beams. The terminal may select a reception beam having the largest RSRP (or RSRQ, RSSI) among the reception beams as an optimal reception beam.

In the above-described downlink beam management procedure, a downlink (DL) beam pair between the base station and the terminal may be selected. The DL beam pair may include a transmission beam of the base station and a reception beam of the terminal. When beam correspondence is assumed, the DL beam pair may be regarded as an uplink (UL) beam pair. That is, the transmission beam of the base station in the DL beam pair may be regarded as a reception beam of the base station in uplink communication, and the reception beam of the terminal in the DL beam pair may be regarded as a transmission beam of the terminal in uplink communication. In this case, a separate uplink beam management procedure may not be performed.

When beam correspondence is not assumed, an uplink beam management procedure for determining a UL beam pair may be performed. In the uplink beam management procedure, the terminal may transmit SRS(s) based on the beam sweeping scheme, and the base station may perform a measurement operation on the SRS(s) received from the terminal. The base station may report a result of the measurement operation (e.g., RSRP(s) of the SRS(s)) to the terminal, and the terminal may determine an optimal transmission beam based on the RSRP(s) reported from the base station. The terminal may transmit SRS(s) using one transmission beam (e.g., optimal transmission beam), and the base station may perform a measurement operation on the SRS(s) received from the terminal by performing beam sweeping. The base station may select a reception beam having the largest RSRP among the reception beams as an optimal reception beam.

Meanwhile, the communication system may support sidelink communication for direct communication between terminals. The sidelink communication has been introduced in the form of device-to-device (D2D) communication for the purpose of public safety, and has been extended to vehicle-to-vehicle (V2V) communication. The sidelink communication may be performed in a high frequency band (e.g., mmWave band, FR2 band). In this case, beam-based sidelink communication may be performed, and a beam management method (e.g., a beam selection method, a beam change method, and a beam refinement method) for the beam-based sidelink communication may be required.

The sidelink beam management method may be applied to sidelink communication, downlink communication, and/or uplink communication. The sidelink beam management method may be applied to unicast communication, groupcast communication, and/or broadcast communication. In unicast communication, communication between one transmitting terminal and one receiving terminal may be performed. In groupcast communication, communication between one transmitting terminal and a group including a plurality of receiving terminals may be performed. In broadcast communication, communication between one transmitting terminal and a plurality of receiving terminals (i.e., a plurality of receiving terminals not belonging to a specific group) may be performed.

In sidelink communication, a transmitting terminal may mean a terminal transmitting data, and a receiving terminal may mean a terminal receiving the data. A waveform of a sidelink signal may be OFDM, windowed OFDM, or filtered OFDM. In sidelink communication, a subcarrier spacing (SCS) may be 15 kHz, 30 kHz, 60 kHz, 120 kHz, or 240 kHz. A sidelink resource may be included in a bandwidth part (BWP) having one numerology in the frequency domain. Sidelink resources may be included in a resource pool defined in the time domain and the frequency domain.

Sidelink channels may include a physical sidelink control channel (PSCCH), a physical sidelink shared channel (PSSCH), a physical sidelink broadcast channel (PSBCH), and a physical sidelink feedback channel (PSFCH). Sidelink signals may include sidelink (S)-PSS, S-SSS, DMRS, CSI-RS, and the like. The S-SSB may include S-PSS, S-SSS, and physical sidelink broadcast channel (PSBCH). In addition, the S-SSB may further include a PSBCH DMRS. The PSBCH DMRS may mean a DMRS used for demodulation of the PSBCH. The sidelink beam management method may be applied to Mode 1 and/or Mode 2. In Mode 1, sidelink resources may be allocated by the base station. In Mode 2, sidelink resources may be allocated by the terminal. The sidelink beam management method may be classified into a channel measurement-based beam management method and a zone-based beam management method.

[Channel Measurement-Based Beam Management Method]

The channel measurement-based beam management method may be applied in a 'sidelink initial access procedure' or a 'subsequent procedure of the sidelink initial access procedure'.

Figure 10:
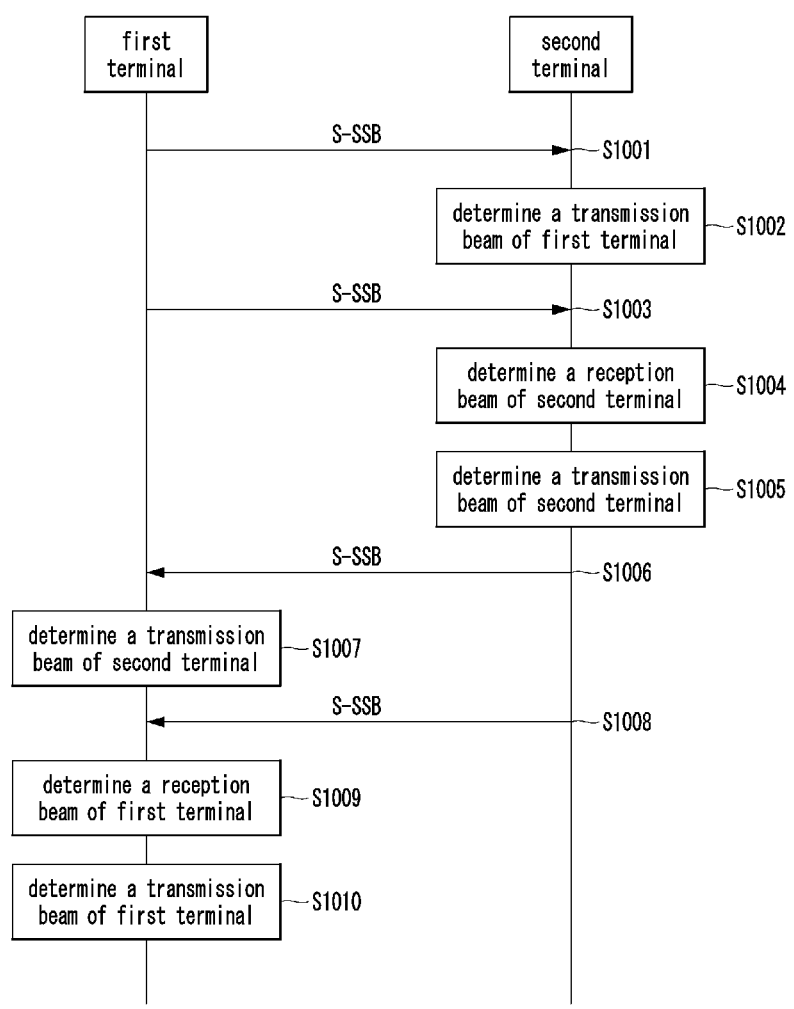
FIG. 10 is a sequence chart illustrating a first exemplary embodiment of a channel measurement-based beam management method.

FIG. 10 is a sequence chart illustrating a first exemplary embodiment of a channel measurement-based beam management method.

Referring to FIG. 10, a channel measurement-based beam management method may be performed between a first terminal and a second terminal. The first terminal may mean a transmitting terminal, and the second terminal may mean a receiving terminal. The first terminal may transmit S-SSBs (S1001, S1003). The S-SSB may be transmitted periodically. The first terminal may transmit the S-SSBs as in an exemplary embodiment of FIG. 11 below.

Figure 11:
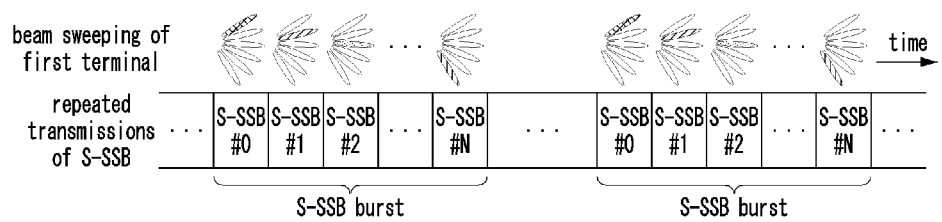
FIG. 11 is a conceptual diagram illustrating a first exemplary embodiment of an S-SSB transmission method.

FIG. 11 is a conceptual diagram illustrating a first exemplary embodiment of an S-SSB transmission method.

Referring to FIG. 11, in a sidelink initial access procedure or a subsequent procedure of the sidelink initial access procedure, the first terminal (e.g., transmitting terminal) may periodically transmit S-SSBs based on the beam sweeping scheme. That is, the first terminal may transmit the S-SSBs using different beams in the time domain. The S-SSBs may be transmitted in the form of an S-SSB burst.

The second terminal may receive S-SSB(s) from the first terminal and may perform a measurement operation on the received S-SSB(s). The second terminal may determine a transmission beam (e.g., optimal transmission beam) of the first terminal based on a result of the measurement operation (S1002). For example, the second terminal may measure RSRP(s) (or RSRQ(s), RSSI(s)) of the S-SSB(s), identify an index of an S-SSB having the largest RSRP, and determine a transmission beam associated with the identifier S-SSB index as an optimal transmission beam of the first terminal. RSRP(s) for S-PSS(s), S-SSS(s), and/or PSBCH DMRS(s) included in the S-SSB(s) may be measured.

After determining the transmission beam of the first terminal, a procedure for determining a reception beam of the second terminal mapped to the corresponding transmission beam may be performed. The second terminal may perform an S-SSB measurement operation by sweeping reception beams with respect to the transmission beam (i.e., the transmission beam determined in the step S1002) of the first terminal associated with the same S-SSB index. The second terminal may determine an optimal reception beam from among the reception beam(s) based on a result of the measurement operation (S1004). For example, a reception beam through which an S-SSB having the largest RSRP is received may be determined as an optimal reception beam of the second terminal.

The second terminal may determine a transmission beam of the second terminal based on beam correspondence (S1005). For example, the transmission beam of the second terminal may be configured to be the same as the reception beam of the second terminal. In addition, the second terminal may determine a reception beam of the first terminal based on beam correspondence. For example, the reception beam of the first terminal may be configured to be the same as the transmission beam of the first terminal.

The above-described procedure (e.g., S1001 to S1005) may be a procedure for determining an SL beam pair in the second terminal, and a procedure for determining (or identify) an SL beam pair in the first terminal may be required. The second terminal may transmit S-SSBs (S1006, S1008). The second terminal may transmit the S-SSBs as in the exemplary embodiment of FIG. 11. The first terminal may receive S-SSB(s) from the second terminal and may perform a measurement operation on the received S-SSB(s). The first terminal may determine a transmission beam (e.g., optimal transmission beam) of the second terminal based on a result of the measurement operation (S1007). For example, the first terminal may measure RSRP(s) (or RSRQ(s), RSSI(s)) of the S-SSB(s), identify an index of an S-SSB having the largest RSRP, and determine a transmission beam associated with the identified S-SSB index as an optimal transmission beam of the second terminal. RSRP(s) for S-PSS(s), S-SSS(s), and/or PSBCH DMRS(s) included in the S-SSB(s) may be measured.

After determining the transmission beam of the second terminal, a procedure for determining a reception beam of the first terminal mapped to the corresponding transmission beam may be performed. The first terminal may perform an S-SSB measurement operation by sweeping reception beams with respect to the transmission beam (i.e., the transmission beam determined in the step S1007) of the second terminal associated with the same S-SSB index. The first terminal may determine an optimal reception beam from among the reception beam(s) based on a result of the measurement operation (S1009). For example, a reception beam through which an S-SSB having the largest RSRP is received may be determined as an optimal reception beam of the first terminal. Alternatively, the second terminal may periodically transmit S-SSB(s) using the transmission beam determined in the step S1005. In this case, the first terminal may determine an optimal reception beam of the first terminal based on a measurement result of S-SSB(s) received through the same transmission beam of the second terminal.

The first terminal may determine a transmission beam of the first terminal based on beam correspondence (S1010). For example, the transmission beam of the first terminal may be configured to be the same as the reception beam of the first terminal. In addition, the first terminal may determine a reception beam of the second terminal based on beam correspondence. For example, the reception beam of the second terminal may be configured to be the same as the transmission beam of the second terminal.

The transmission of the S-SSB(s) by each terminal may be triggered (or initiated) based on a control of the base station, necessity of beam management in each terminal, request according to necessity for beam management in another terminal, and/or preconfigured conditions for each terminal.

Figure 12:
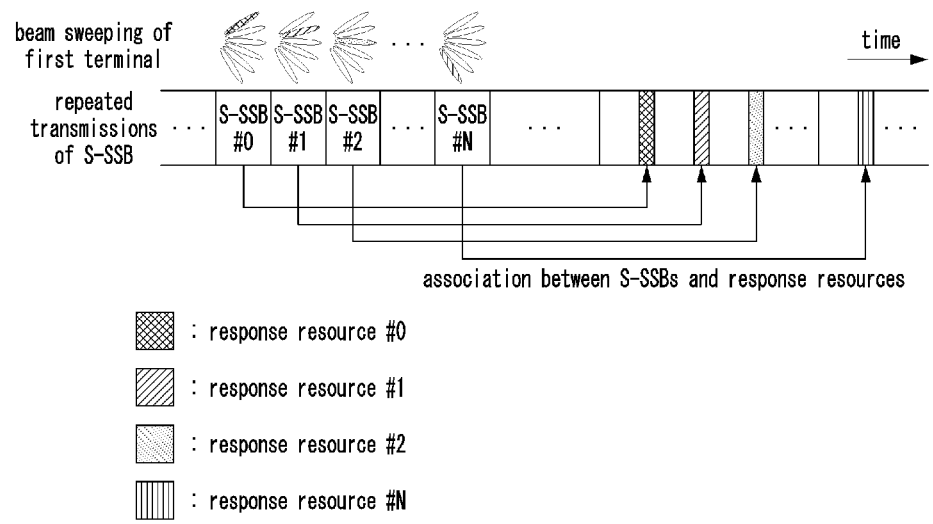
FIG. 12 is a conceptual diagram illustrating a second exemplary embodiment of a channel measurement-based beam management method.

FIG. 12 is a conceptual diagram illustrating a second exemplary embodiment of a channel measurement-based beam management method.

Referring to FIG. 12, response resources associated with S-SSBs may be configured. An S-SSB #0 may be associated with a response resource #0, an S-SSB #1 may be associated with a response resource #1, an S-SSB #2 may be associated with a response resource #2, and an S-SSB #N may be associated with a response resource #N. N may be a natural number. The response resources may be arranged (e.g., configured) to be distinguished in the time domain. Alternatively, the response resources may be arranged to be distinguished in the frequency domain. Alternatively, the response resources may be arranged to be distinguished in the time domain and the frequency domain. The response resources may be PSFCH, PSCCH, PSSCH, and/or CSI-RS resources.

The base station may transmit configuration information of the association between the S-SSB(s) and the response resource(s) to terminal(s). Alternatively, the first terminal may transmit configuration information of the association between the S-SSB(s) and the response resource(s) to other terminal(s). The configuration information of the association between the S-SSB(s) and the response resource(s) may be transmitted using at least one of system information, an RRC message, a MAC message (e.g., MAC control element (CE)), or a PHY message (e.g., downlink control information (DCI), SCI (sidelink control information)). The terminal(s) may receive the configuration information from the base station or another terminal, and may identify the association between the S-SSB(s) and the response resource(s) based on the configuration information.

The first terminal may transmit S-SSBs based on the beam sweeping scheme. The second terminal may receive S-SSB(s) from the first terminal and may perform a measurement operation on the S-SSB(s). The second terminal may identify an index of an S-SSB having the largest RSRP (e.g., RSRQ, RSSI) among the S-SSB(s), and identify a response resource associated with the identified S-SSB index. For example, when the S-SSB index identified by the second terminal is the S-SSB #1, the second terminal may identify the response resource #1 associated with the S-SSB #1, and transmit a signal (e.g., response signal) to the first terminal in the response resource #1. The response signal may be used to inform the first terminal of the S-SSB index selected by the second terminal. The second terminal may determine a transmission beam of the first terminal through which the S-SSB #1 is transmitted as an optimal transmission beam. The first terminal may perform a monitoring operation on the response resources. When the signal (e.g., response signal) of the second terminal is received in the response resource #1, the first terminal may identify the S-SSB #1 associated with the response resource #1, identify a transmission beam through the S-SSB #1 is transmitted among transmission beams, and determine the identified transmission beam as an optimal transmission beam.

A response resource associated with an S-SSB may be a PSFCH. In an exemplary embodiment, a PSFCH may mean a PSFCH resource. The PSFCH may be configured periodically. For example, the PSFCH may be configured every 1 slot, 2 slots, or 4 slots. That is, a transmission opportunity (e.g., transmission occasion) of the response signal for the S-SSB may be configured according to a transmission periodicity of the PSFCH. The response signal may be transmitted on a PSFCH associated with the selected S-SSB index. The base station or the first terminal may inform terminal(s) of a position (e.g., PRB index, subcarrier index) of a frequency resource used for transmission of the response signal within the PSFCH. In this case, the second terminal may transmit the response signal to the first terminal by using the frequency resource configured by the base station or the first terminal within the PSFCH associated with the selected S-SSB. The first terminal may perform a monitoring operation on the frequency resource configured for the second terminal within the PSFCH in order to receive the response signal from the second terminal.

Alternatively, the base station or the first terminal may inform terminal(s) of a value of cyclic shift of a Zadoff-Chu sequence applied to the response signal. In this case, the second terminal may generate the response signal using the cyclic shift value indicated by the base station or the first terminal, and may transmit the corresponding response signal to the first terminal on the PSFCH associated with the selected S-SSB. The first terminal may detect the response signal of the second terminal based on the cyclic shift value configured to the second terminal. That is, the first terminal may perform a monitoring operation for the PSFCH by using the cyclic shift value to detect the response signal of the second terminal.

In sidelink communication, the PSFCH may be used to transmit data feedback (e.g., hybrid automatic repeat request (HARQ)-acknowledgement (ACK) information). Therefore, a method for distinguishing whether a signal transmitted and received on a PSFCH is a feedback signal or a response signal (e.g., signal indicating the selected S-SSB index) may be required. The type of signal transmitted and received on the PSFCH may be distinguished according to whether data is transmitted or not. The second terminal may receive data (e.g., SL data) from the first terminal. When transmission of HARQ-ACK (i.e., feedback) for the data is required, the second terminal may transmit ACK or negative ACK (NACK) to the first terminal on a PSFCH. When data received from the first terminal does not exist and transmission of an S-SSB index is required, the second terminal may transmit a response signal to the first terminal on a PSFCH associated with the S-SSB index.

The first terminal may transmit data to the second terminal, and may expect to receive a HARQ-ACK for the corresponding data on a PSFCH. Accordingly, the first terminal may identify ACK or NACK based on the feedback signal (i.e., HARQ-ACK information) received on the PSFCH. The first terminal may perform a monitoring operation for PSFCH(s) even when data is not transmitted to the second terminal. In this case, when a signal is received on a PSFCH, the first terminal may determine that the corresponding signal is not a feedback signal but a response signal. The first terminal may identify an S-SSB index associated with the PSFCH on which the response signal is received, and may identify a transmission beam through which an S-SSB having the identified S-SSB index is transmitted.

Alternatively, a type of signal transmitted and received on a PSFCH may be distinguished by a value of a HARQ feedback enable/disable indicator included in an SCI format 2 (e.g., SCI format 2-A, SCI format 2-B, and SCI format 2-C). When the value of the HARQ feedback enable/disable indicator included in the SCI format 2 transmitted by the first terminal indicates 'enable', the PSFCH may be used for transmission and reception of a feedback signal. When the value of the HARQ feedback enable/disable indicator included in the SCI format 2 transmitted by the first terminal indicates 'disable', the PSFCH may be used for transmission and reception of a response signal. Even when the value of the HARQ feedback enable/disable indicator indicates 'disable', the first terminal may perform a monitoring operation for PSFCH(s) to receive a response signal.

In order to support the above-described operation, the base station may transmit information indicating to perform a monitoring operation for PSFCH(s) even when the value of the HARQ feedback enable/disable indicator in sidelink communication indicates 'disable' through system information and/or an RRC message. When the performing of the monitoring operation for PSFCH(s) even when the value of the HARQ feedback enable/disable indicator in sidelink communication indicates 'disable' is configured by the base station, the first terminal that has transmitted the SCI format 2 may perform the PSFCH monitoring operation regardless of the value of the HARQ feedback enable/disable indicator included in the corresponding SCI format 2.

When the sidelink initial access procedure is completed, a PC5 interface may be established between the first terminal and the second terminal. In this case, control by a PC5-RRC may be possible. Each sidelink may be distinguished by a source identifier (ID) and/or a destination ID. In a PC5-RRC connected state, a beam management procedure (e.g., beam selection procedure, beam change procedure, and beam refinement procedure) using a CSI-RS may be performed. When the beam management procedure is required, the first terminal may transmit SCI including information (e.g., CSI request) indicating activation of CSI reporting. The information indicating activation of CSI reporting may implicitly indicate that a CSI-RS for CSI reporting is transmitted. After transmitting the SCI, the first terminal may transmit a CSI-RS within a PSSCH resource (e.g., a time and frequency resource preconfigured within a PSSCH).

A transmission scheme of the CSI-RS may be configured by PC5-RRC configuration. In this case, it may be configured that the CSI-RS is repeatedly transmitted a preset number of times in the time domain. The CSI-RS may be transmitted based on a beam sweeping scheme. For example, the first terminal may transmit the CSI-RS using different beams in the time domain. The beam sweeping operation may be performed on transmission beam(s) and/or reception beam(s). According to the above-described procedure, an optimal transmission beam and an optimal reception beam may be identified. The optimal transmission beam and optimal reception beam may be a beam pair. Information on the beam pair may be shared between terminals through a CSI feedback. Alternatively, the information on the beam pair may be shared between terminals through a PC5-RRC message.

[Zone-Based Beam Management Method]

Figure 13:
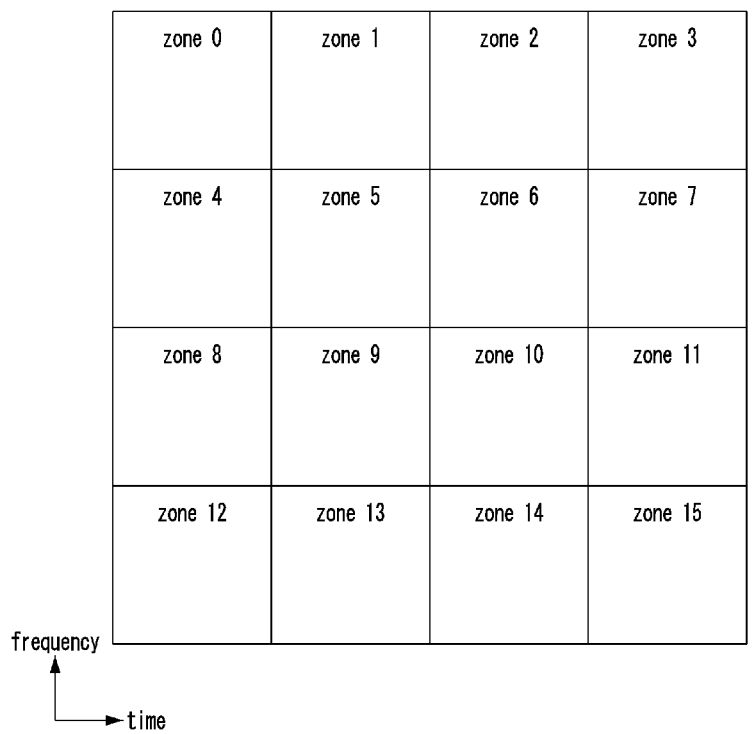
FIG. 13 is a conceptual diagram illustrating a first exemplary embodiment of zones in sidelink communication.

FIG. 13 is a conceptual diagram illustrating a first exemplary embodiment of zones in sidelink communication.

Referring to FIG. 13, a beam management method may be performed based on zones. A zone may refer to a geographical region in which sidelink communication is performed. Zones may be configured at regular intervals along vertical and/or horizontal directions on a two-dimensional plane. In a sidelink resource allocation operation and/or feedback operation, a zone may be used to identify a location of a terminal and/or a distance between terminals. A transmitting terminal may identify a distance between the transmitting terminal and a receiving terminal and/or a direction from the transmitting terminal to the receiving terminal based on zones where the transmitting terminal and/or the receiving terminal are located. The transmitting terminal may obtain information on a zone of the receiving terminal (e.g., an ID of a zone where the receiving terminal is located), and may determine a transmission beam of the transmitting terminal based on the information on the zone so that a received signal strength (e.g., RSRP, RSRQ, RSSI) at the receiving terminal is to be the maximum.

Figure 14:
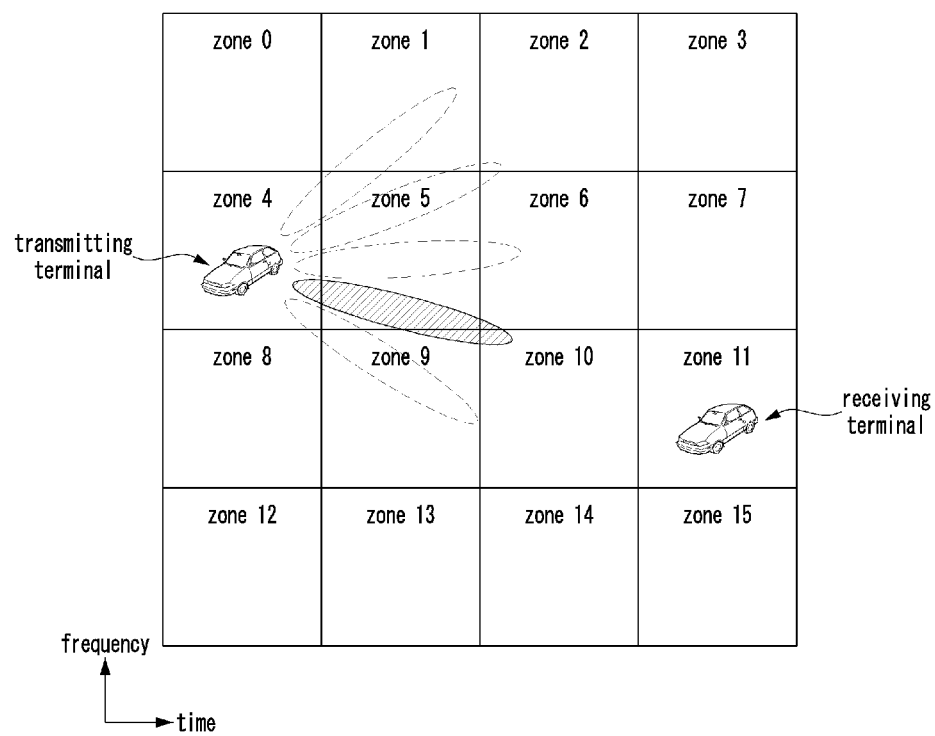
FIG. 14 is a conceptual diagram illustrating a first exemplary embodiment of a transmission beam selection method.

FIG. 14 is a conceptual diagram illustrating a first exemplary embodiment of a transmission beam selection method.

Referring to FIG. 14, each of the transmitting terminal and the receiving terminal may be mounted on a vehicle. The transmitting terminal may identify its location based on an ID of a zone in which it is located. For example, when the transmitting terminal is located in a zone 4, the location of the transmitting terminal may be a center of the zone 4. Alternatively, the transmitting terminal may identify its location through a Global Navigation Satellite System (GNSS). The transmitting terminal may receive information on a zone of the receiving terminal (e.g., an ID of a zone where the receiving terminal is located) from the receiving terminal or the base station. The transmitting terminal may identify a location of the receiving terminal based on the information on the zone. For example, when the receiving terminal is located in a zone 11, the transmitting terminal may determine a location of a center of the zone 11 as the location of the receiving terminal. The transmitting terminal may select a transmission beam directed to the receiving terminal from among transmission beams of the transmitting terminal in consideration of the location of the transmitting terminal and the location of the receiving terminal.

Figure 15:
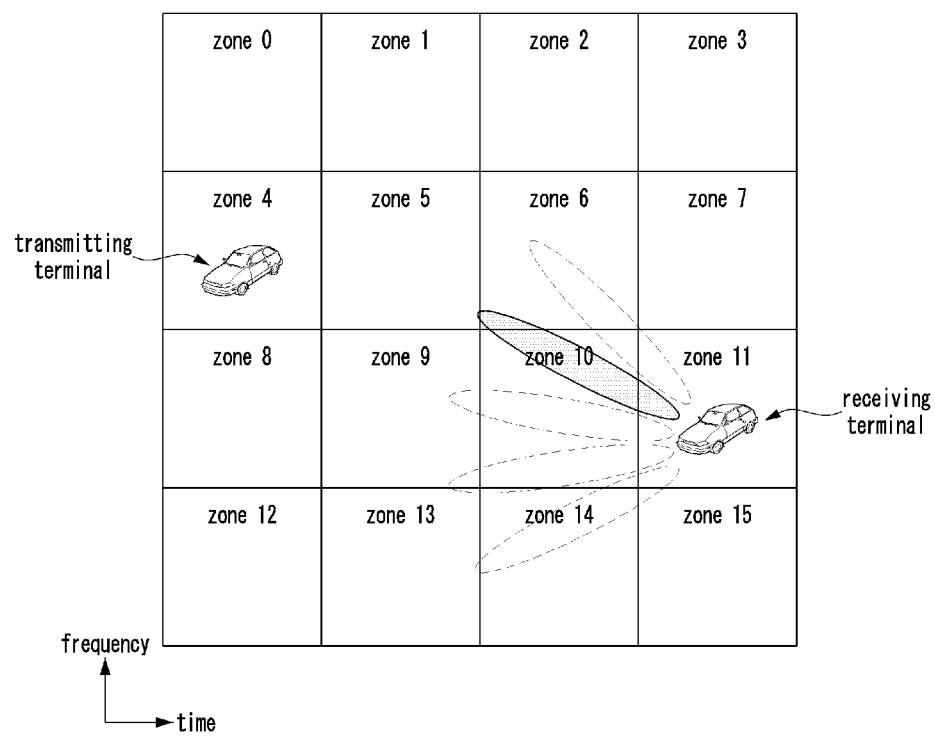
FIG. 15 is a conceptual diagram illustrating a first exemplary embodiment of a reception beam selection method.

FIG. 15 is a conceptual diagram illustrating a first exemplary embodiment of a reception beam selection method.

Referring to FIG. 15, each of the transmitting terminal and the receiving terminal may be mounted on a vehicle. The receiving terminal may identify its location based on an ID of a zone in which it is located. For example, when the receiving terminal is located in the zone 11, the location of the receiving terminal may be the center of the zone 11. Alternatively, the receiving terminal may identify its location through a GNSS. The receiving terminal may receive information on a zone of the transmitting terminal (e.g., an ID of a zone in which the transmitting terminal is located) from the transmitting terminal or the base station. The receiving terminal may determine a location of the transmitting terminal based on the information on the zone. For example, when the transmitting terminal is located in the zone 4, the receiving terminal may determine the location of the center of the zone 4 as the location of the transmitting terminal. The receiving terminal may select a reception beam directed to the transmitting terminal from among reception beams of the receiving terminal in consideration of the location of the transmitting terminal and the location of the receiving terminal.

Figure 16:
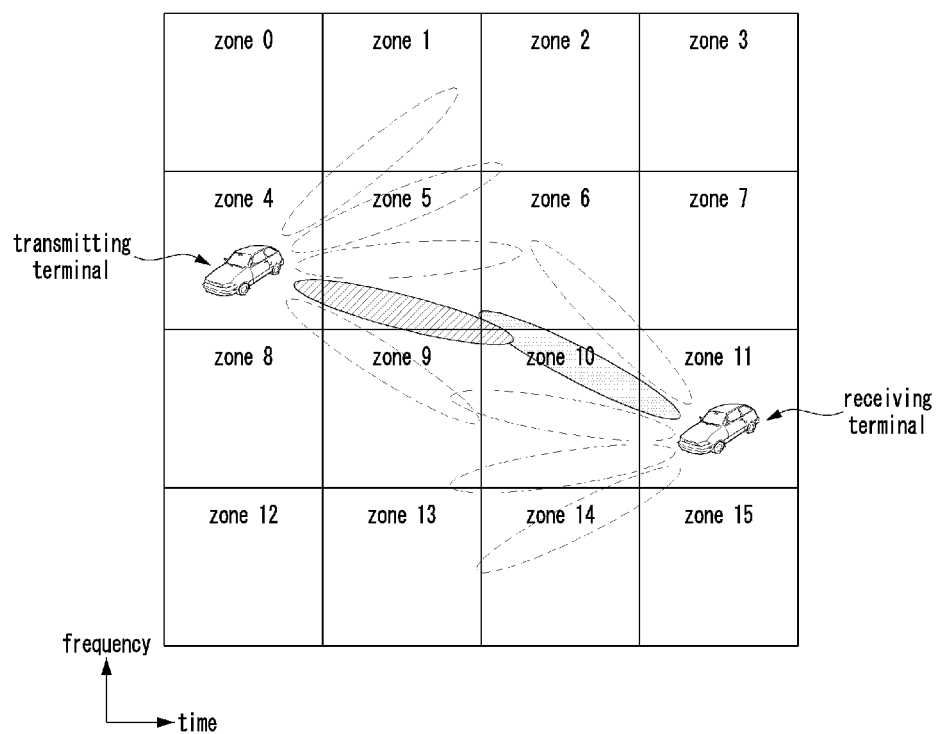
FIG. 16 is a conceptual diagram illustrating a first exemplary embodiment of a beam pair determined in the zone-based beam management method.

FIG. 16 is a conceptual diagram illustrating a first exemplary embodiment of a beam pair determined in the zone-based beam management method.

Referring to FIG. 16, according to the exemplary embodiment shown in FIG. 14, the transmission beam (e.g., optimal transmission beam) of the transmitting terminal may be selected, and according to the exemplary embodiment shown in FIG. 15, the reception beam (e.g., optimal reception beam) of the receiving terminal may be selected. That is, a beam pair (e.g., SL beam pair) including the transmission beam of the transmitting terminal and the reception beam of the receiving terminal may be determined. Information on the beam pair may be shared between the transmitting terminal and the receiving terminal.

Information on a zone (i.e., zone information) including an identifier (ID) of the zone may be transmitted using at least one of PSBCH, system information, RRC message (e.g., PC5-RRC message), MAC CE, or SCI. The PSBCH may be included in an S-SSB. The system information, RRC message, and/or MAC CE may be transmitted on a PSSCH. The SCI may be transmitted on a PSCCH and/or a PSSCH. In addition, the zone information including the zone identifier may be transmitted on a physical broadcast channel (PBCH), a physical downlink control channel (PDCCH), and/or a physical downlink shared channel (PDSCH).

[Configuration of the Beam Management Method]

In sidelink communication, the beam management method may be classified into the channel measurement-based beam management method and the zone-based beam management method. The base station may inform the type of beam management method (e.g., channel measurement-based beam management method or zone-based beam management method) to be performed in terminal(s) to the terminal(s) by using system information, an RRC message, a MAC message, and/or a PHY message. The terminals may perform a beam management method according to the type indicated by the base station. Alternatively, the terminal may determine the type of beam management method (e.g., channel measurement-based beam management method or zone-based beam management method), and may inform the type of beam management method to other terminals by using system information, an RRC message (e.g., PC5-RRC message), MAC message, and/or PHY message. According to the methods described above, the type of beam management method performed in the terminal may be shared among terminals.

Application of the channel measurement-based beam management method when the transmitting terminal and the receiving terminal are located in the same zone may be configured in advance. For example, the base station may transmit, to terminal(s), information indicating to perform the channel measurement-based beam management method when the transmitting terminal and the receiving terminal are located in the same zone, through at least one of system information, an RRC message, a MAC message, or a PHY message. The base station may transmit, to terminal(s), information indicating to perform the zone-based beam management method when the transmitting terminal and the receiving terminal are located in different zones, through at least one of system information, an RRC message, a MAC message, or a PHY message. When the above-described information is configured by the base station, the terminal(s) may identify the type of zones (e.g., the same zone or different zones) to which the terminal(s) belongs, and may perform the channel measurement-based beam management method or the zone-based channel measurement method according to the identified type.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a first terminal, comprising:
   transmitting a plurality of sidelink-synchronization signal blocks (S-SSBs);
   performing a monitoring operation on a plurality of response resources associated with the plurality of S-SSBs;
   receiving a first response signal from a second terminal in a first response resource among the plurality of response resources;
   identifying a first S-SSB associated with the first response resource among the plurality of S-SSBs; and
   determining a first transmission beam through which the first S-SSB is transmitted among a plurality of transmission beams of the first terminal as an optimal transmission beam,
   wherein the plurality of response resources are a plurality of physical sidelink feedback channel (PSFCH) resources, and
   when data transmission between the first terminal and the second terminal is not performed, the plurality of PSFCH resources are used for transmission of a response signal for notifying an S-SSB selected by the second terminal instead of hybrid automatic repeat request (HARQ)-acknowledgement (ACK) information.

2. The operation method according to claim 1, further comprising receiving, from the base station, configuration information of an association relationship between the plurality of S-SSBs and the plurality of response resources.

3. The operation method according to claim 1, wherein the plurality of response resources are configured to be distinguished in at least one of time domain and frequency domain.

4. The operation method according to claim 1, wherein a beam management scheme in sidelink communication is classified into a channel measurement-based beam management scheme and a zone-based beam management scheme, beam management is performed based on a measurement result of S-SSBs in the channel measurement-based beam management scheme, beam management is performed based on information on zones in which the first terminal and the second terminal are located without the measurement result of S-SSBs in the zone-based beam management scheme, and information indicating a type of the beam management scheme is received from the base station.

5. The operation method according to claim 1, further comprising transmitting, to the second terminal, information indicating a frequency resource used for transmission of a response signal for notifying an S-SSB selected by the second terminal from among the plurality of PSFCH resources, wherein the first response signal is received through the frequency resource indicated by the first terminal within the first response resource.

6. The operation method according to claim 1, further comprising transmitting, to the second terminal, a cyclic shift value applied to a response signal for notifying an S-SSB selected by the second terminal, wherein the monitoring operation on the plurality of response resources is performed using the cyclic shift value.

7. An operation method of a second terminal, comprising:
receiving configuration information of an association relationship between a plurality of sidelink-synchronization signal blocks (S-SSBs) and a plurality of response resources;
receiving, from the first terminal, sidelink control information (SCI) including an HARQ feedback enable/disable indicator;
performing a measurement operation on the plurality of S-SSBs received from a first terminal;
selecting a first S-SSB from among the plurality of S-SSBs based on a result of the measurement operation;
identifying a first response resource associated with the first S-SSB among the plurality of response resources based on the configuration information; and
transmitting a first response signal to the first terminal in the first response resource,
wherein the plurality of response resources are a plurality of physical sidelink feedback channel (PSFCH) resources, and
when a value of the HARQ feedback enable/disable indicator indicates 'disable', the plurality of PSFCH resources are used for transmission of a response signal for notifying an S-SSB selected by the second terminal instead of HARQ-ACK information.

8. The operation method according to claim 7, wherein a beam management scheme in sidelink communication is classified into a channel measurement-based beam management scheme and a zone-based beam management scheme, beam management is performed based on a measurement result of S-SSBs in the channel measurement-based beam management scheme, beam management is performed based on information on zones in which the first terminal and the second terminal are located without the measurement result of S-SSBs in the zone-based beam management scheme, and information indicating a type of the beam management scheme is received from a base station or the first terminal.

9. The operation method according to claim 7, further comprising receiving, from the first terminal, information indicating a frequency resource used for transmission of a response signal for notifying an S-SSB selected by the second terminal from among the plurality of PSFCH resources, wherein the first response signal is transmitted through the frequency resource indicated by the first terminal within the first response resource.

10. The operation method according to claim 7, further comprising receiving, from the first terminal, a cyclic shift value applied to a response signal for notifying an S-SSB selected by the second terminal, wherein the first response signal is generated based on the cyclic shift value.

11. An operation method of a first terminal, comprising:
receiving information indicating a type of beam management from a base station;
based on the type being a zone-based beam management scheme among a channel measurement-based beam management scheme and the zone-based beam management scheme, identifying a first location of the first terminal;
obtaining zone information indicating a second zone in which a second terminal is located;
identifying a second location of the second terminal based on the zone information; and
selecting a first beam directed to the second terminal from among a plurality of beams of the first terminal in consideration of the first location and the second location,
wherein the beam management is performed based on a measurement result of sidelink-synchronization signal blocks (S-SSBs) in the channel measurement-based beam management scheme, and the beam management is performed based on information on zones in which the first terminal and the second terminal are located without the measurement result of the S-SSBs in the zone-based beam management scheme.

12. The operation method according to claim 11, wherein the first location is identified based on information of a first zone in which the first terminal is located or information obtained through a Global Navigation Satellite System (GNSS).

13. The operation method according to claim 11, wherein the second location is determined as a center location of the second zone in which the second terminal is located.

* * * * *